No. 629,561. T. HARRISON. Patented July 25, 1899.
VALVE FOR BICYCLE TIRES.
(Application filed Oct. 2, 1897.)

(No Model.)

Witnesses:

Inventor:
Thomas Harrison
By Richards
his Attorneys.

UNITED STATES PATENT OFFICE.

THOMAS HARRISON, OF WHITLEY, ENGLAND.

VALVE FOR BICYCLE-TIRES.

SPECIFICATION forming part of Letters Patent No. 629,561, dated July 25, 1899.

Application filed October 2, 1897. Serial No. 653,837. (No model.)

*To all whom it may concern:*

Be it known that I, THOMAS HARRISON, a subject of the Queen of Great Britain and Ireland, residing at Countess avenue, Whitley, in the county of Northumberland, England, have invented certain new and useful Improvements in Valves for Pneumatic Tires and other Purposes, (for part of which invention I have obtained a patent in Great Britain, No. 5,605, dated March 3, 1897,) of which the following is a specification.

My invention relates to valves for pneumatic tires, and has for its object to provide a valve more reliable and efficient for the purpose than those hitherto in use and by which leakage is prevented and the inflation and deflation of the tire more easily and readily accomplished. To this end and according to my invention I arrange within the valve-casing two stop-valves and one non-return valve, the former controlling the inner passage to the air-tube and an outer passage to the atmosphere, the non-return valve controlling the air-admission from the inflator and arranged in some cases between the inner stop-valve and air-tube. The stop-valves and in some cases the non-return valve are arranged for deflation as hereinafter described.

I will describe my invention with reference to the accompanying drawings, in which—

Figure 1:
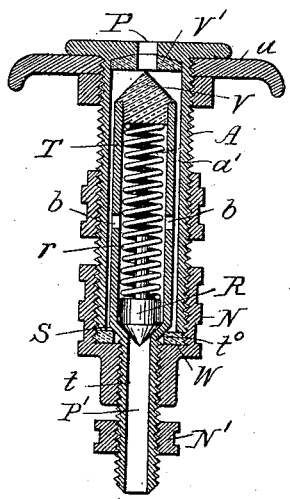
Figure 2:
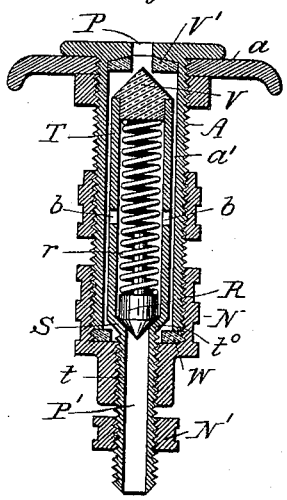
Figure 3:
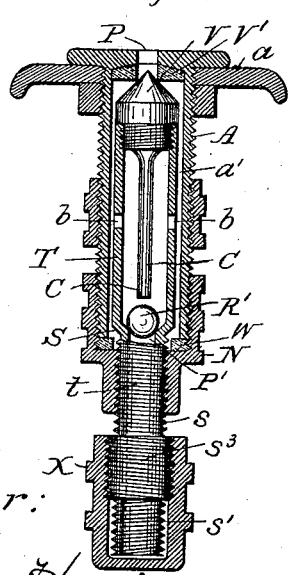

Figures 1 and 2 are sectional elevations of one form of valve. Fig. 3 shows a modified arrangement of valve.

Referring to Figs. 1 and 2, A is the valve-casing, having the usual means, as shown at $a$, for securing same to the tire or air-tube. Within the casing A is an inner tube T of less diameter than the interior of the casing A, forming an intervening annular space $a'$, the said tube T having at its inner end a stop-valve V, seated in an appropriately-formed part of the casing, or a washer, as at V', and controlling the admission of air to and from the air-tube by the passage P. At its outer end the inner tube T has another stop-valve S seated over the screwed joint $t^0$ between the part T and the nut or cap N, which screwed part is formed of such fit as to freely pass air for deflation. The stop-valve S may be formed by suitably reducing the tube T, as shown, its seat being formed by a washer of vulcanized fiber or suitable material, such as W, or a specially-formed part of the casing, or the external nut or cap N, screwing upon the outer casing and upon the inner tube T, as described. The washer W also serves to make a tight joint between the outer casing and nut or cap N. The said tube T passes outward, as at $t$, and is screwed or otherwise formed for reception of the inflator and carries a fixed adjusting nut or cap, such as N'. Within the inner tube is arranged a non-return valve R, of ebonite, brass, steel, or other suitable material, with spring $r$, as in Fig. 1, or in the form of a ball-valve, as at R', Fig. 3. This valve has its seat at the reduced part $t^0$ of the tube T and is adapted to pass air into the inner tube by the passage P' on operation of the inflator, for the use of which the adjusting-nut N' is operated to unscrew the part $t$ sufficient to shut the outer stop-valve S and open the inner stop-valve V, as shown in Fig. 1. From the inner tube T the air passes by apertures $b$ in the walls thereof to the space $a'$ past the inner stop-valve V to the air-tube, its return being prevented by the non-return valve R and the outer stop-valve S.

In Fig. 3 is shown the inner tube T, with a non-return valve of the ball type having its seat over the air-admission passage P' and kept in position for action by a projecting spindle or part of the valve-casing C, preferably of less diameter than the ball and adapted to come about its inner central part, allowing it to rise only a short distance from its seat, so that by reason of the entering air under pressure on inflation the ball rotates or vibrates between its seat and the projecting spindle C and will always find its seat on the back stroke of the inflator or withdrawal of external pressure in whatever position the valve may be at the time.

When the tire is inflated, the external nut N' is operated to screw the part $t$ up tight, shutting the inner stop-valve V and effectually securing the air within the tire. A similar result is obtained when the nut N' is screwed tightly down, as in Fig. 1, closing the outer and opening the inner stop-valve, the non-return valve R being held tightly upon its seat by its spring $r$ or the air-pressure, thus providing an alternative or an additional means for preventing leakage of air from the tire.

When it is desired to deflate the tire, the adjusting-nut N' is half unscrewed, as shown in Fig. 2, when both the inner and outer stop-valves being half open the air can escape.

In order that the valves may be more readily operated and in a more or less automatic manner, I have devised the arrangements shown in Fig. 3, in which the extended part $t$ of the inner tube T is shown provided with reversely-screwed parts $s\ s'$ and a fixed part $s^3$ at the junction of the reversely-screwed parts, so that on screwing on the inflator-nozzle (shown dotted at $i$) the latter will engage the part $s^3$ and further movement will unscrew the reversely-threaded part $s$, consequently drawing down the inner tube T and opening the inner valve V, at the same time shutting the valve S and the tire may be inflated. After inflation on unscrewing the nozzle $i$ the latter being tightly pressed against the part $s^3$ carries it with it and therefore at the same time screws up the tube T until the valve V comes upon its seat. Continued movement disengages the nozzle $i$ from the part $s^3$, and the nozzle is unscrewed and removed. The outer part of $s^3$ is screwed with a thread of the same kind as that upon the part $t'$, so that the screwing of the dust-cap (shown at X, Fig. 3) thereon, if at all, assists to shut and keep the valve V tight, and the valve may be opened or operated for use of the inflator by unscrewing the dust-cap; but should this fail to act the screwing on of the inflator-nozzle will complete the operation.

Having now described my invention, what I claim, and desire to secure by Letters Patent, is—

1. The improvement in valves for pneumatic tires and the like, comprising the combination of an inner tube or valve-carrying part and an inclosing casing with a space between same and the inner tube, a non-return valve seated over an air-admission passage and arranged within the inner tube or part, the latter having apertures in its walls and a stop-valve carried at either end of said tube adapted to be seated over a passage to the air-chamber and a passage for deflation, all arranged and adapted for operation substantially in the manner and for the purposes set forth.

2. The improvements in valves for pneumatic tires and other purposes comprising an outer casing an inner tube within and of less diameter than the interior of said outer casing and having apertures in its walls and carrying a stop-valve at either end, a non-return valve arranged in the inner tube and having a centrally-disposed guide or spindle at its back, suitable air-passages being provided and the stop-valves arranged for deflation, substantially in the manner set forth.

3. A valve for pneumatic tires and other purposes comprising an outer casing, an internal valve-carrying part having apertures in its walls communicating with the inflation-nozzle, a cap and washer for securing the valve-carrying part in position and providing an air-tight joint with the outer valve on the latter during inflation and also with the outer casing, and an external nut for operating the valve or valves substantially as set forth.

In witness whereof I have hereunto set my hand in presence of two witnesses.

THOMAS HARRISON.

Witnesses:
HENRY A. PRYOR,
J. A. HARVEY.